United States Patent [19]
Diedrich

[11] Patent Number: 5,080,502
[45] Date of Patent: Jan. 14, 1992

[54] RADIAL ROLLING BEARING

[75] Inventor: Michael Diedrich, Herzogenaurach, Fed. Rep. of Germany

[73] Assignee: INA Walzlager Schaeffler KG, Fed. Rep. of Germany

[21] Appl. No.: 684,306

[22] Filed: Apr. 12, 1991

[30] Foreign Application Priority Data

May 10, 1990 [DE] Fed. Rep. of Germany ............ 9005328.1[U]

[51] Int. Cl.$^5$ .................. F16C 33/58; F16C 33/76
[52] U.S. Cl. ...................... 384/564; 384/484; 384/561
[58] Field of Search ............ 384/559, 560, 561, 564, 384/569, 570, 584, 515, 477, 484–486, 449, 58

[56] References Cited

U.S. PATENT DOCUMENTS

| | | | |
|---|---|---|---|
| 3,007,752 | 11/1961 | Gales | 384/484 X |
| 4,787,758 | 11/1988 | Jacob | 384/564 X |
| 4,997,297 | 3/1991 | Blount | 384/561 X |

FOREIGN PATENT DOCUMENTS

| | | | |
|---|---|---|---|
| 1283605 | 11/1968 | Fed. Rep. of Germany | 384/559 |
| 2718212 | 11/1978 | Fed. Rep. of Germany | 384/561 |
| 549746 | 2/1923 | France | 384/564 |

Primary Examiner—Thomas R. Hannon
Attorney, Agent, or Firm—Bierman and Muserlian

[57] ABSTRACT

A sealed radial rolling bearing, particularly for use as a supporting or curve roller, comprising race rings arranged concentrically in each other with mutually facing raceways between which cylindrical rolling elements roll, a flanged wheel of angular cross-section being provided at least one axial end of the inner ring for the axial guiding of the rolling elements, wherein the axial leg of the flanged wheel is fitted on the outer peripheral surface of the inner ring under radial pre-tension and a part of the outer periphery of the flanged wheel forms a counter-surface for a seal arranged on the outer ring, characterized in that the inner ring has a smooth cylindrical periphery surface and the radial leg of the flanged wheel bears against the front face of the inner ring.

1 Claim, 1 Drawing Sheet

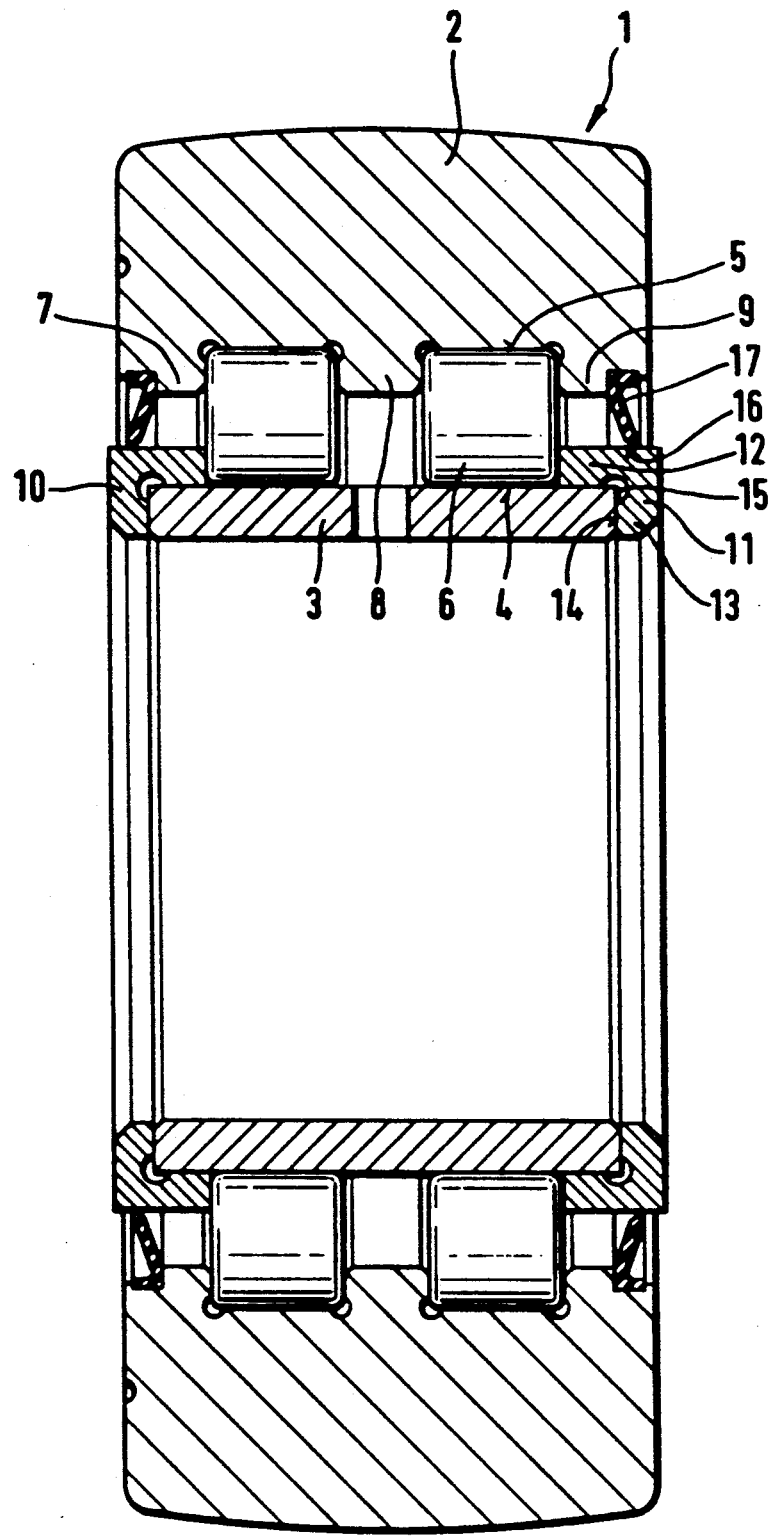

RADIAL ROLLING BEARING

STATE OF THE ART

Sealed radial rolling bearings, particularly for use as a supporting or curve roller, comprising race rings arranged concentrically in each other with mutually facing raceways between which cylindrical rolling elements roll, a flanged wheel of angular cross-section being provided at at least one axial end of the inner ring for the axial guiding of the rolling elements, wherein the axial leg of the flanged wheel is fitted on the outer peripheral surface of the inner ring under radial pre-tension and a part of the outer periphery of the flanged wheel forms a counter-surface for a seal arranged on the outer ring are known from CH-PS 628,961. In this, the flanged wheels are inserted into grooves of the inner ring and an O-ring is provided at the contact surface between the flanged wheel and the inner ring to improve sealing.

Such curve rollers do serve their purpose but the grooves in the inner ring, as also the flanged wheels and the rolling elements have to be very precisely worked because, if not, axial wedging or a too large play of the rolling elements can occur due to the flanges. Because of the precision-grooves to be worked into the inner ring, such a bearing is expensive to manufacture.

OBJECTS OF THE INVENTION

It is an object of the invention to provide a radial rolling bearing of this type wherein the fitting of the flanged wheels on the inner ring is simplified and the bearing can be manufactured economically.

This and other objects and advantages of the invention will become obvious from the following detailed description.

THE INVENTION

The novel radial bearing of the invention, particularly for use as a supporting or curve roller is comprised of race rings arranged concentrically in each other with mutually facing raceways between which cylindrical rolling elements roll, a flanged wheel of angular cross-section being provided at at least one axial end of the inner ring for the axial guiding of the rolling elements, wherein the axial leg of the flanged wheel is fitted on the outer peripheral surface of the inner ring under radial pre-tension and a part of the outer periphery of the flanged wheel forms a counter-surface for a seal arranged on the outer ring, characterized in that the inner ring has a smooth cylindrical peripheral surface and the radial leg of the flanged wheel bears against the front face of the inner ring.

By virtue of this design of the radial rolling bearing, it is achieved that the inner ring can be made with an easy-to-manufacture smooth cylindrical peripheral surface, the only requirement regarding the inner ring being that the length dimension be observed. The angular flanged wheels can be pressed onto this inner ring in a simple manner without the need of special measures for controlling the axial dimension. If necessary, it is possible to observe the axial distance between the flanged wheels which is decisive for the axial play of the cylindrical rolling elements with a high degree of precision, for example by proper assorting.

In a preferred embodiment of the invention, a weak point in the form of a wall-thickness reduction in the bend of the angular profile of the flanged wheels is provided to exclude the danger of constrictions of the inner ring contingent upon the increased stiffness of the angular profile when the flanged wheel is pressed on.

Referring now to the drawing.

FIG. 1 is a cross-section through an embodiment of a radial rolling bearing of the invention.

The figure shows a radial rolling bearing 1 which in this case can be used as a supporting roller. The radial rolling bearing 1 consists of the outer ring 2 and the inner ring 3 arranged concentrically with this, the rings comprising mutually facing raceways 4, 5 between which two rows of cylindrical rolling elements 6 are arranged. In the outer ring, the cylindrical rolling elements 6 are guided axially by the flanges 7, 8 and 9. The axial guiding of the rolling elements 6 on the inner ring 3 is effected by the angular flanged wheels 10, 11 arranged respectively on the sides of the inner ring 3. These flanged wheels are pressed onto the inner ring 3 with their axial leg 12 whereas the radial leg 13 bears against the front face 14 of the inner ring 3. To prevent the inner ring 3 from being constricted due to the increased stiffness of the flanged wheels, 10, 11 resulting from their angular profile, weak points 15 in the form of a wall-thickness reduction are provided in the flanged wheels 10, 11 in the region of the bend.

The outer peripheral surface of the flanged wheels 10, 11 is at the same time made as a counter-surface 16 for the seals 17. By the centering of the flanged wheels 10, 11 on the inner ring 3, it is possible without any problem to adjust the counter-surface for the seal on the inner ring 3 so that circularity errors which could lead to the destruction of the seal 17 are avoided.

Various modifications of the bearing of the invention may be made without departing from the spirit or scope thereof and it is to be understood that the invention is intended to be limited only as defined in the appended claims.

What I claim is:

1. A sealed radial rolling bearing, particularly for use as a supporting or curve roller, comprising race rings arranged concentrically in each other with mutually facing raceways between which cylindrical rolling elements roll, a flanged wheel of angular cross-section being provided at at least one axial end of the inner ring for the axial guiding of the rolling elements, wherein the axial leg of the flanged wheel is fitted on the outer peripheral surface of the inner ring under radial pre-tension and a part of the outer periphery of the flanged wheel forms a counter-surface for a seal arranged on the outer ring, the inner ring having a smooth cylindrical peripheral surface and the radial leg of the flanged wheel bears against the front face of the inner ring, characterized in that the flanged wheel has a wall-thickness-reduced weak point in the bend of the angular cross-section.

* * * * *